United States Patent
Wilson et al.

(10) Patent No.: US 6,944,158 B1
(45) Date of Patent: Sep. 13, 2005

(54) FLOW INTEGRITY FOR PATH TRANSITIONING DATA SWITCH

(75) Inventors: Mike Wilson, Thousand Oaks, CA (US); John D. Wallner, Camarillo, CA (US); Christopher L. Hoogenboom, Oxnard, CA (US); Joe Golio, North Plymouth, MN (US); Bob Kowalski, Vadnais Heights, MN (US); Jeff Miller, Shakopee, MN (US); Steve Senum, North Maple Grove, MN (US)

(73) Assignee: Alcatel, Paris (FR)

( * ) Notice: Subject to any disclaimer, the term of this patent is extended or adjusted under 35 U.S.C. 154(b) by 856 days.

(21) Appl. No.: 09/718,150

(22) Filed: Nov. 20, 2000
(Under 37 CFR 1.47)

Related U.S. Application Data (60) Provisional application No. 60/185,153, filed on Feb. 18, 2000.

(51) Int. Cl.[7] ............................................. H04L 12/28
(52) U.S. Cl. ..................................... 370/392; 370/401
(58) Field of Search ............................... 370/389, 392, 370/390, 401, 422, 423, 402

(56) References Cited

U.S. PATENT DOCUMENTS

| | | | |
|---|---|---|---|
| 5,559,883 A | * | 9/1996 | Williams .................... 713/201 |
| 5,617,421 A | * | 4/1997 | Chin et al. .................. 370/402 |
| 5,884,036 A | | 3/1999 | Haley |
| 5,884,043 A | | 3/1999 | Teplitsky |
| 5,898,687 A | * | 4/1999 | Harriman et al. ........... 370/390 |
| 6,553,029 B1 | * | 4/2003 | Alexander .................. 370/389 |

OTHER PUBLICATIONS

The ATM Forum, LAN Emulation Over ATM Version 1.0, 141 pages, Jan. 1995.

* cited by examiner

Primary Examiner—Chau Nguyen
Assistant Examiner—Andrew Wahba
(74) Attorney, Agent, or Firm—Craig A. Hoersten; V. Lawrence Sewell (57) ABSTRACT

A data switch includes multiple switching modules interconnected over a backplane. The data switch maintains flow integrity while path transitioning. The flow integrity can be maintained by temporarily disabling one or more of the switching modules from transmitting data units over the backplane for a flow undergoing a path transition. The disable condition is imposed when the path transition is commenced, and is lifted after the path transition is completed and an interval has passed ensuring that all data units for the flow transmitted to the backplane prior to imposing the disable condition have cleared the backplane. The backplane includes a multicast fabric and a unicast fabric, wherein flow path transitions are made from the multicast fabric to the unicast fabric upon source learning. All switching modules are temporarily disabled from transmitting data units having as a destination address an address undergoing source learning to the backplane.

24 Claims, 8 Drawing Sheets

FLOW INTEGRITY FOR PATH TRANSITIONING DATA SWITCH

CROSS-REFERENCE TO RELATED APPLICATIONS

This application claims the benefit of the filing date of U.S. provisional patent application No. 60/185,153, filed Feb. 18, 2000 and entitled "Flow Integrity for Path Transitioning Data Switch," the contents of which are hereby incorporated by reference. This application is related to U.S. patent application Ser. No. 09/718,046 filed Nov. 20, 2000 and entitled "Source Learning for Multi-Path Backplane Data Switch."

FIELD OF THE INVENTION

The present invention relates to devices for switching data and, more particularly, to devices for switching data while maintaining flow integrity.

BACKGROUND OF THE INVENTION

Data switches interconnect network devices residing in different parts of a network. Such switches typically include network interface modules having ports supporting external network devices. In order to avoid having to "flood" packets on ports of the switch which do not support a destination device, such switches often dynamically learn associations between network interface modules and the devices they support. Such associations are often learned through what is called a "source learning" process. In an exemplary source learning process, source addresses in packets are reviewed by the switch upon ingress and unknown source addresses are submitted to a source learning function resident on the switch. The source learning function typically updates the switch such that future packets destined to that source can be forwarded without unnecessary flooding.

While the source learning function has worked well in data switches, it typically gives rise to certain complications as the backplanes in such switches change from the single flow path variety to a multiple flow path variety. A conventional backplane used to interconnect network interface modules in a modular data switch has a common path for all packets between two network interface modules. All packets transmitted on the backplane for a particular flow typically have been propagated on a common path and the network interface modules have been responsible for individually reviewing the packets and making filtering decisions. However, due to demands for faster switching, there is an emerging trend favoring multiple flow path backplanes.

In a multiple flow path backplane architecture, packets destined for a destination device may be transmitted to a multicast fabric for queuing, replication, and forwarding to all network interface modules on a set of point-to-point paths before the destination device/network interface module association becomes known. On the other hand, packets destined for the destination device may be transmitted to a unicast fabric for queuing and forwarding to a single network interface module on a point-to-point path after the destination device/network interface module association becomes known.

Accordingly, in the case where destination device/network interface module associations are established through source learning, packets for a particular flow may be transmitted to the multicast fabric prior to learning the destination device's address. On the other hand, packets for the flow may be transmitted to the unicast fabric once the destination device's address is learned. This dynamic transition from multicast to unicast fabrics, often made in connection with source learning, gives rise to certain technical challenges. For instance, a packet transmitted to the unicast fabric at time $t_2$ may be forwarded to the network interface module associated with the destination device before a packet for the same flow transmitted to the multicast fabric at an earlier time $t_1$. This would result in the network interface module receiving and processing packets for the flow out of order, disrupting the integrity of the flow.

Therefore, there is a need for a multiple flow path data switch that is capable of maintaining flow integrity during path transitions.

SUMMARY OF THE INVENTION

In one embodiment of the present invention, a path transitioning data switch is provided. The path transitioning data switch has a plurality of switching modules and a backplane interconnecting the switching modules on a plurality of paths. A flow integrity of data units for a flow undergoing path transition is maintained by temporarily disabling one or more of the switching modules from transmitting the data units for the flow to the backplane.

In another embodiment of the present invention, a path transitioning data switch having a plurality of switching modules is provided. A backplane interconnects the switching modules on a plurality of paths. The data switch includes: means for transmitting a first data unit for a flow from a first switching module to a second switching module on a first path; means for temporarily disabling the first switching module from transmitting data units for the flow; means for transitioning the flow from the first switching module to the second switching module to a second path; and means for transmitting a second data unit for the flow from the first switching module to the second switching module on the second path.

In yet another embodiment of the present invention, a path transitioning data switch having a plurality of switching modules is provided. A backplane interconnects the switching modules. The data switch includes: means for transmitting a first data unit having a first address as a destination address over the backplane; means for transmitting a second data unit having the first address as a source address over the backplane; and means in response to the second data unit for temporarily disabling transmission over the backplane of data units having the first address as a destination address.

In yet another embodiment of the present invention, a method of flow path transitioning in a data communication switch is provided. The data communication switch has a plurality of flow paths and a plurality of network interface modules. A first packet having an unknown source address is received from a source device coupled to a first network interface module. The first packet is transmitted over a first flow path to one or more network interface modules. Source learning of the source address is performed. The first network interface module is disabled from transmitting packets from the source device to other network interface modules while source learning of the source address is being performed.

In yet another embodiment of the present invention, a data communication switch having a backplane is provided. A plurality of network interface modules are interconnected over the backplane. Each network interface module includes: an access controller having a port for receiving a plurality of packets; a switching controller coupled to the access controller for receiving the packets from the access controller, and for processing the packets for routing; and a fabric controller coupled to the switching controller for receiving the packets from the switching controller, and for processing the packets for transmitting over the backplane to one or more other network interface modules. The fabric controller receives packets from the other network interface modules and provides them to the switching controller, and the switching controller provides the packets from the other network interface modules to the access controller for transmitting out of the port.

In yet another embodiment of the present invention, a method of maintaining flow integrity in a data communication switch is provided. The data communication switch has a plurality of network interface modules coupled over a backplane. Each network interface module has a plurality of ports. A packet of a flow is received on a first network interface module. The packet is discarded if both source and destination addresses are found. It is determined as to whether only the source address is found unless both the source address and the destination address are found.

BRIEF DESCRIPTION OF THE DRAWINGS

These and other aspects of the invention can be understood by reference to the following detailed description, taken in conjunction with the accompanying drawings, which are briefly described below.

DETAILED DESCRIPTION

Figure 1:
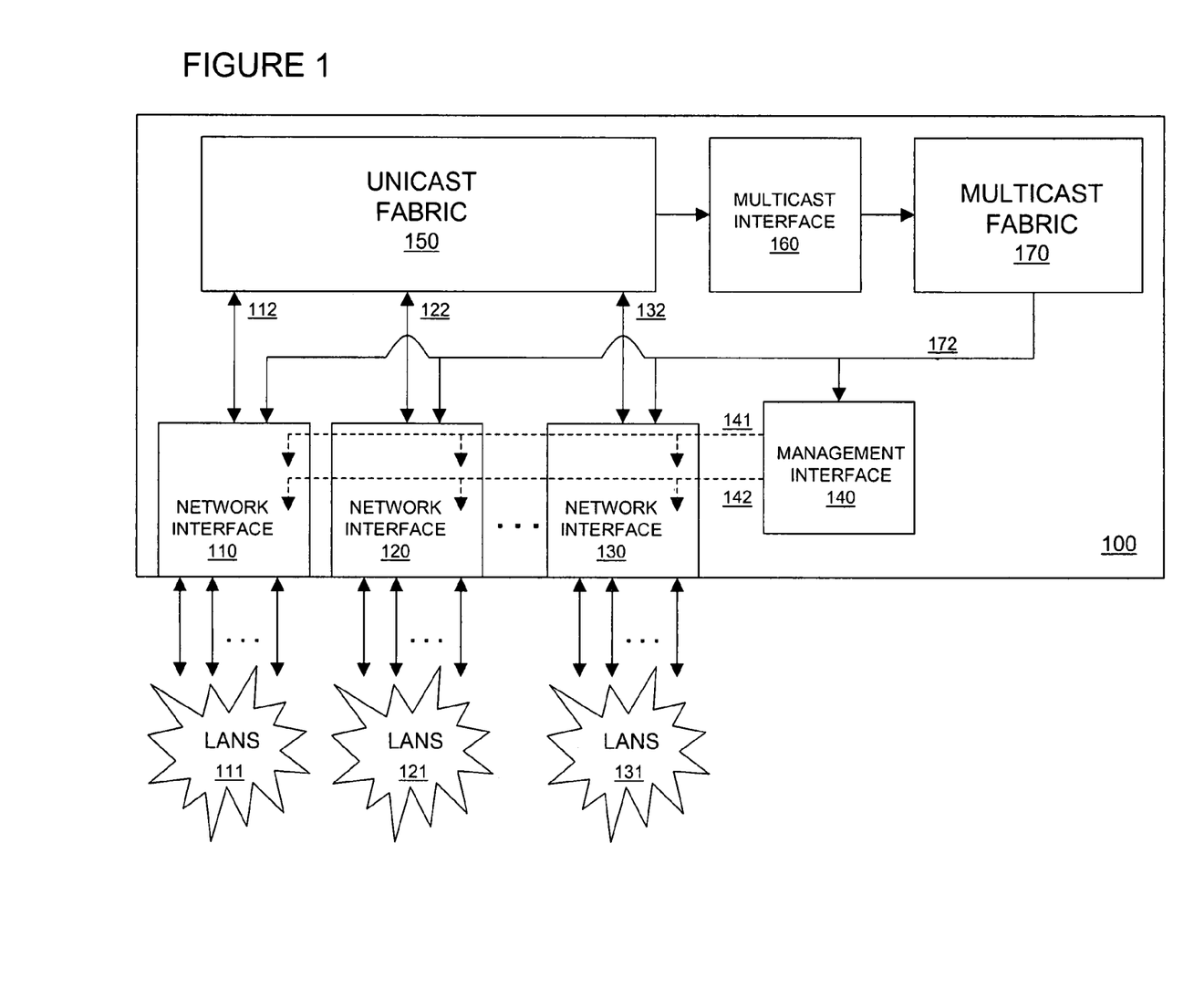
FIG. 1 is a block diagram illustrating a data communication switch with transitioning flow path.

FIG. 1 illustrates a switch 100 including network interface modules 110, 120 and 130. The switch may also be referred to as a data switch, as a data communication switch, or as other designations used by those skilled in the art. The network interface modules may also be referred to as switching modules, or as other designations used by those skilled in the art. The network interface modules 110, 120 and 130 are operatively coupled to LANs 111, 121, and 131, respectively. The switch 100 also includes a management interface module 140, a unicast fabric 150, a multicast interface 160 and a multicast fabric 170. The network interface modules 110, 120, and 130 communicate with the unicast fabric 150 via bi-directional signals 112, 122, and 132, and preferably serve to associate routing information with addresses, cellify data packets, and perform other look-up functions.

The unicast fabric 150 preferably is used as the routing link when the source and destination addresses are known. The multicast interface 160 is operatively coupled to the unicast fabric 150 and to the multicast fabric 170. The multicast interface 160 preferably receives an input signal from the unicast fabric 150 and provides an output signal to the multicast fabric 170. The multicast interface 160 may also receive other signals and provide them to the multicast fabric 170. The output signal may include the input signal, the other signals, or a composite of the input signals and some or all of the other signals. The multicast fabric 170 preferably provides the input signal to the network interface modules for source learning when either the source address or the destination address is unknown.

The multicast fabric 170 is operatively coupled to the multicast interface 160, to the management interface module 140, and to the network interface modules 110, 120, and 130. The multicast fabric 170 preferably is used as the routing link when either the source address or the destination address is not known, or when both the source and destination addresses are not known. The management interface module 140 is operatively coupled to the multicast fabric 170 and to the network interface modules 110, 120, and 130. The management interface module 140 preferably is used to discard packets and update addresses as required. It will be appreciated that the multicast interface 160 and the management interface module 140 may share the same logic block.

Figure 2:
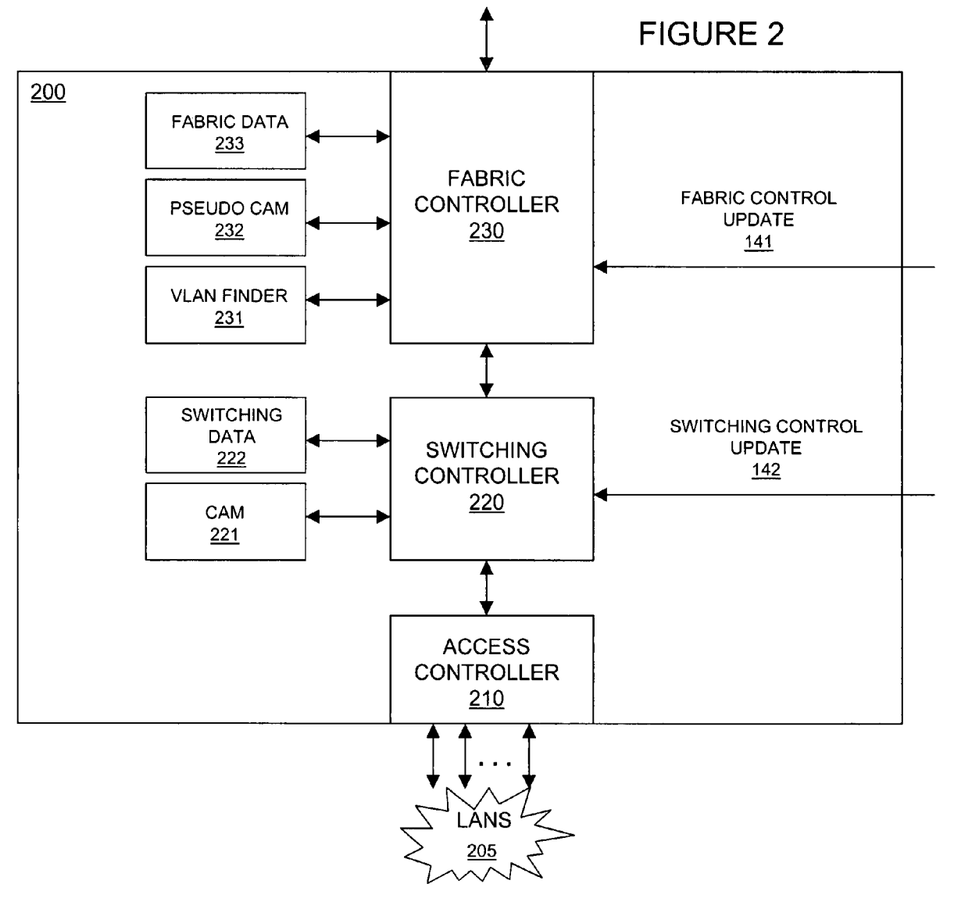
FIG. 2 is a block diagram illustrating in more detail a representative network interface module within the switch of FIG. 1.

FIG. 2 is a block diagram of a network interface module 200, which is representative of all network interface modules in one embodiment of the present invention. The network interface module 200 includes an access controller 210, a switching controller 220, and a fabric controller 230. The access controller 210 preferably includes a simple physical layer device (PHY device), which is coupled to LANs 205. The access controller 210 preferably receives packets off LANs 205 and transmits them to the switching controller 220. The access controller 210 preferably also receives packets from the switching controller 220 and transmits them to the LANs 205.

The switching controller 220 is coupled to modules for facilitating flow integrity, including a switching data module 222 and a content addressable memory (CAM) 221. The switching controller 220 preferably receives packets from the access controller 210, and performs a local CAM lookup using the CAM 221 to retrieve CAM data. The switching controller preferably also performs a switching data lookup by providing CAM data to the switching data module 222 to retrieve switching data. The switching data may also be referred to as forwarding data. Further, the switching controller uses the CAM data and the switching data to process the packets, subjects the packets to flow integrity, and forwards the packets to the fabric controller 230.

The switching controller 220 is also coupled to a switching control update signal 142, which enables the switching controller 220 to update the CAM 221 with further addresses. The fabric controller 230 is coupled to modules for facilitating flow integrity, including a fabric data module 233, a pseudo CAM 232, and a VLAN finder module 231. The fabric controller 230 preferably receives packets from the switching controller 220, and preferably performs a local CAM lookup with either the pseudo CAM 232 or the VLAN finder module 231. The fabric controller preferably also subjects the packets to ingress flow integrity such that the packets are converted into cells, and then preferably forwards those cells out of the network interface module 200.

The fabric controller 230 is also coupled to a fabric control update signal 141 which preferably enables the fabric controller 230 to discard packets for a period of time, which, for example, may have been predetermined. This discard function preferably allows time for the switching controller 220 to update the CAM 221 with a new address. Returning now to FIG. 1, the discard function preferably also allows packets from the multicast fabric 170 to arrive at their destination before packets from the unicast fabric 150 are allowed to propagate to the same destination.

In FIGS. 3 through 7, flow integrity is described in reference to flow diagrams.

Source and Destination Conditions:

One embodiment of the present invention is directed to a novel flow integrity technique using multiple flow path backplanes while performing source learning. In a multiple flow path backplane architecture, packets with either an unknown destination address or an unknown source address are transmitted to a multicast fabric for queuing, replication, and forwarding. On the other hand, packets with known destination and source addresses are transmitted to a unicast fabric for queuing and forwarding to a single network interface module on a point-to-point path. Consequently, the switch in this embodiment preferably is capable of processing and routing packets, wherein each packet presents one of the following four properties to the network interface modules: (1) unknown destination and unknown source; (2) unknown destination and known source; (3) known destination and unknown source; and (4) known destination and known source. In the case where the source and destination addresses are known, no source learning typically takes place and therefore flow integrity is not an issue.

Figure 3:
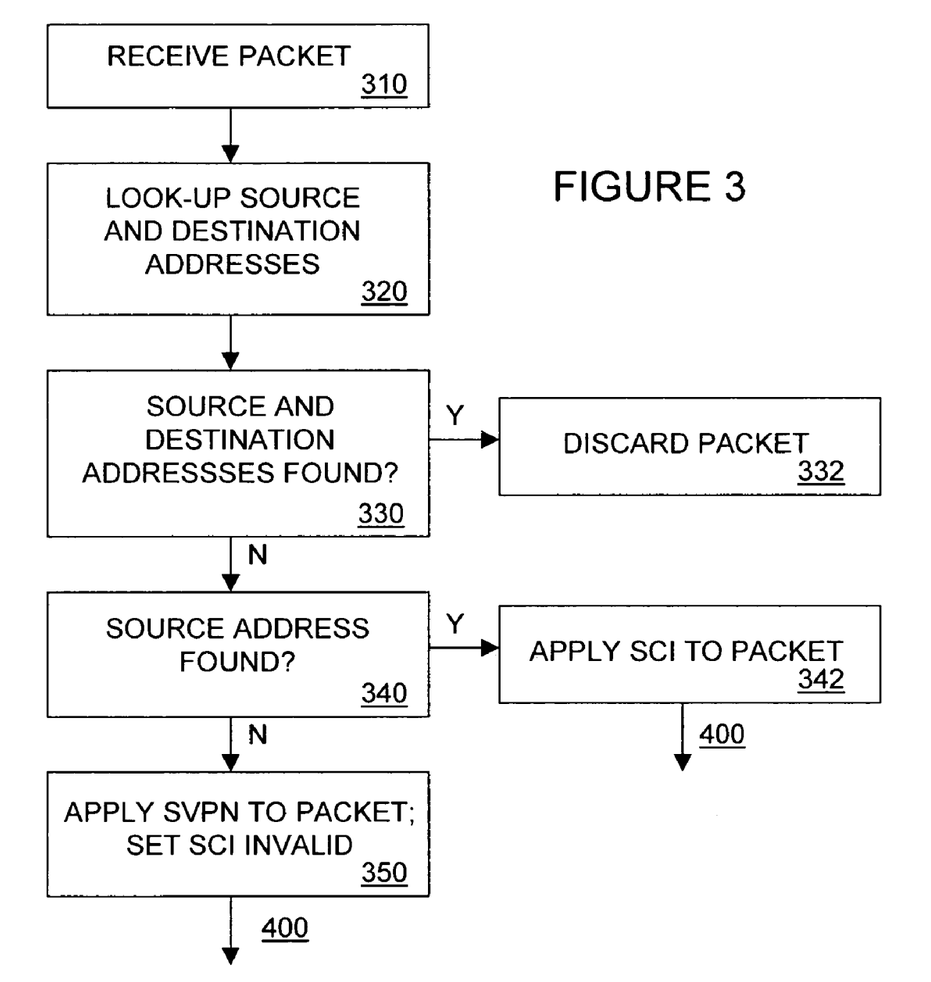
FIG. 3 is a flow diagram illustrating a source and destination indexing protocol in the switch according to FIG. 1.

Unknown Destination and Unknown Source:

Referring to FIG. 3, a packet is received on a physical port of a network interface module (310), which may be similar to the network interface module 200 of FIG. 2. Upon receiving this packet, a look-up operation preferably is performed to find source and destination addresses (320). Unless both the source and destination addresses are found (330), another query preferably is performed, as is the case here, to see if just the source address is found (340). If the source address is not found (340), as is the case here, a source virtual port number (SVPN) preferably is applied to the packet, and a source CAM index (SCI) preferably is set as invalid (350).

Figure 4:
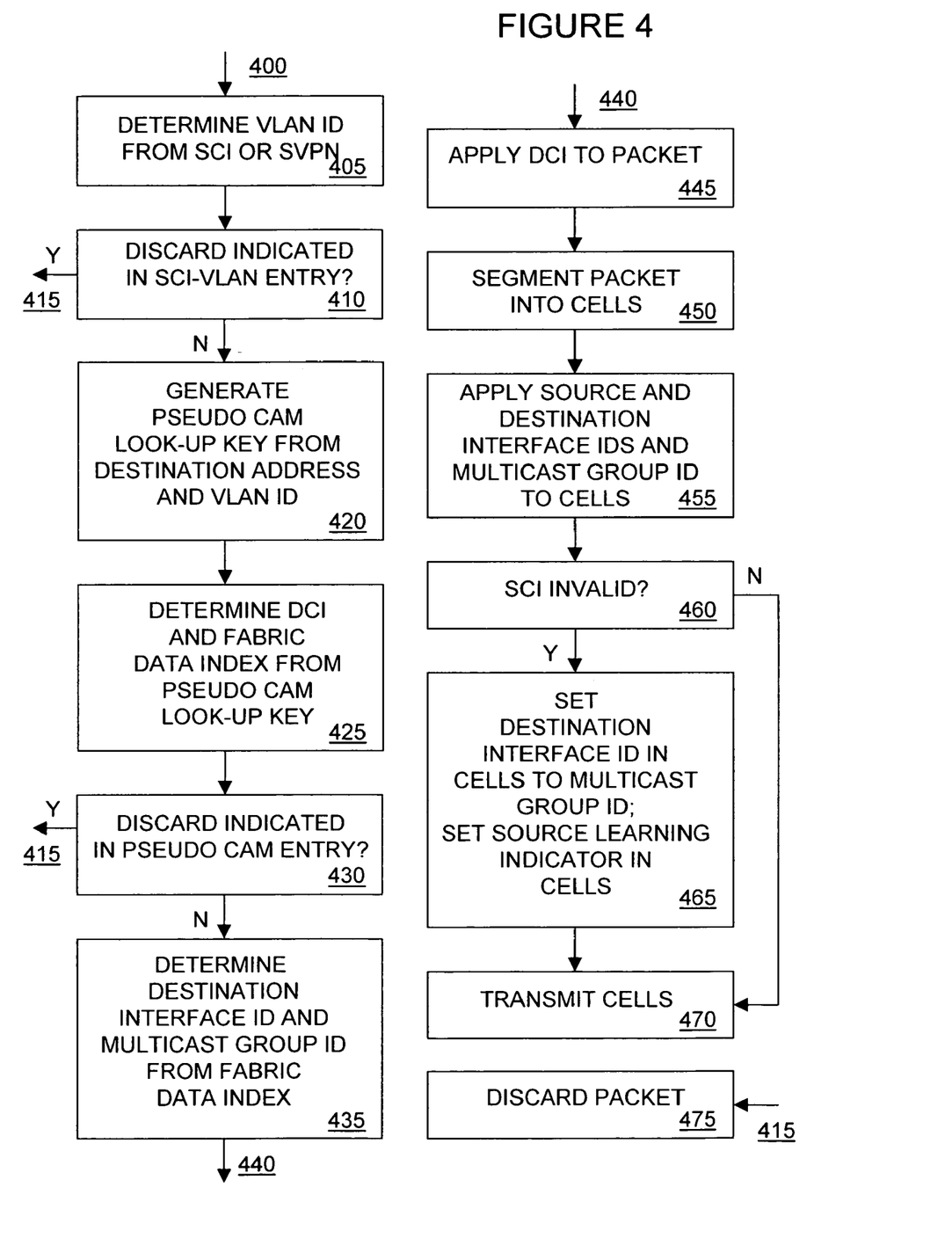
FIG. 4 is a flow diagram illustrating a path transitioning protocol in the switch according to FIG. 1.

Referring to FIG. 4, the packet preferably is operated on to determine its virtual local area network (VLAN) identification (ID) from the SCI or SVPN (405). In this case, the VLAN ID preferably is determined from the SVPN since the SCI has been set as invalid. Next, an SCI-VLAN entry is looked for in the VLAN finder module using the VLAN ID to determine whether a discard indicator is set in the SCI-VLAN entry (410). The setting of the discard indicator in the SCI-VLAN entry preferably indicates that the packet is from the network device whose address is undergoing source learning. If the discard indicator is set (415), the packet preferably is discarded (475), and packets from the same network device preferably are discarded until the discard indicator is no longer set.

Under conditions here, the discard indicator is not set and, as a result, the packet preferably is not discarded. A pseudo CAM look-up key preferably is generated from the destination address and the VLAN ID (420). The pseudo CAM look-up key preferably is used to determine a destination CAM index (DCI) and a fabric data index (FDI) (425). Since the destination address is unknown in this case, a default destination CAM index (DCI) preferably is used.

The pseudo CAM look-up key preferably is also used to retrieve a pseudo CAM entry. If a discard indicator is set in the retrieved pseudo CAM entry (430), the packet preferably is discarded (475). The setting of the discard indicator in the pseudo CAM entry preferably indicates that the packet is destined to the network device whose address is undergoing source learning. Thus, as long as the discard indicator is set, all packets destined to the same network device preferably are discarded. The discard indicator is not set in the pseudo CAM entry in this case, and the packet preferably is not discarded. The FDI preferably is used to determine a destination interface ID and a multicast group ID (435).

Following this, the DCI preferably is applied to the packet (445). Since the destination address is unknown in this case, the DCI preferably has been set as default, which preferably instructs a flood of the network interface modules. After the DCI is applied to the packets, the packets preferably are segmented into cells (450). The cells preferably are then given a source interface ID, the destination interface ID, and the multicast group ID (455). In this case, before the cells are transmitted (470) over the multicast fabric, the destination interface ID preferably is set to the multicast group ID and a source learning indicator preferably is set in the cells (465) since the SCI is invalid (460).

Figure 5:
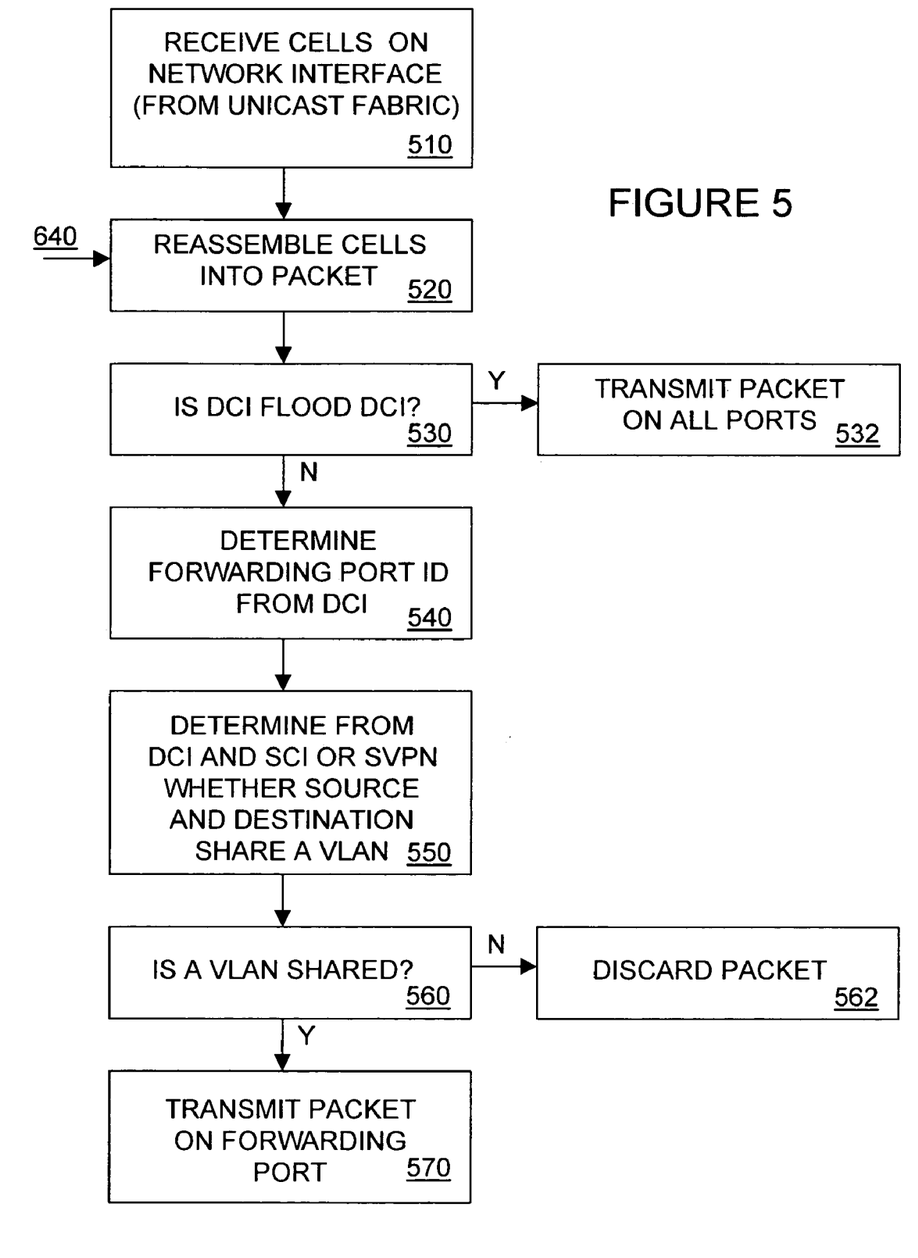
FIG. 5 is a flow diagram illustrating the unicast receive protocol in the switch according to FIG. 1.
Figure 6:
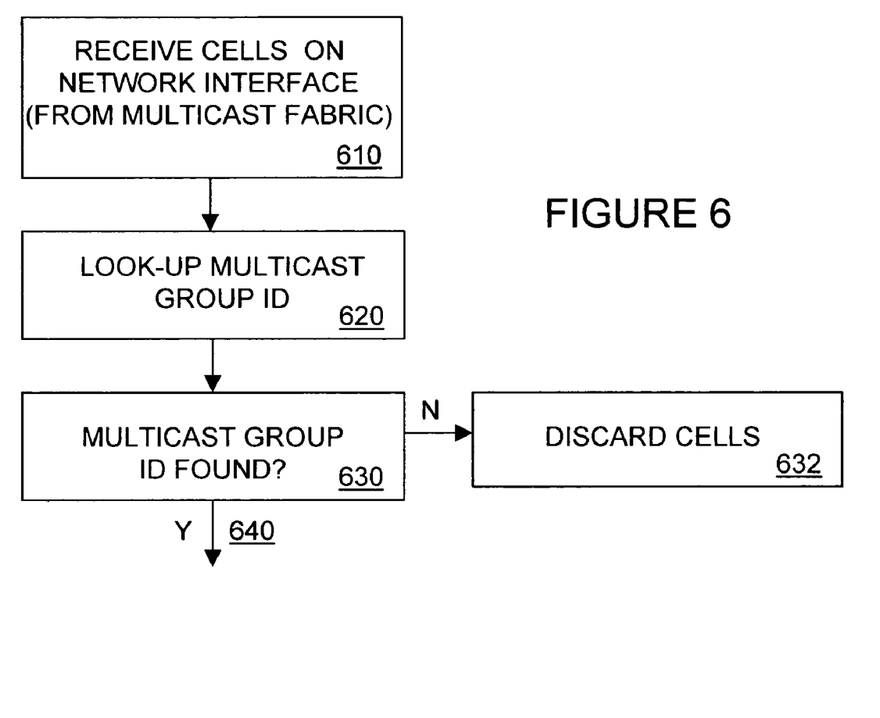
FIG. 6 is a flow diagram illustrating the multicast receive protocol in the switch according to FIG. 1.

Referring to FIG. 6, on receipt of the cells from the multicast fabric (610), the network interface module preferably performs a look-up operation of the multicast group ID (620) to determine whether or not to transmit the cells, i.e., the packet, out of its ports. If the multicast group ID is found (630), the cells preferably are reassembled (520) into the packet as illustrated in FIG. 5. If the DCI indicates flood (530), as is the case here, the packet preferably is transmitted out of all ports (532). For example, the packets preferably flood all ports of the network interface module if the DCI is the default DCI.

Figure 7:
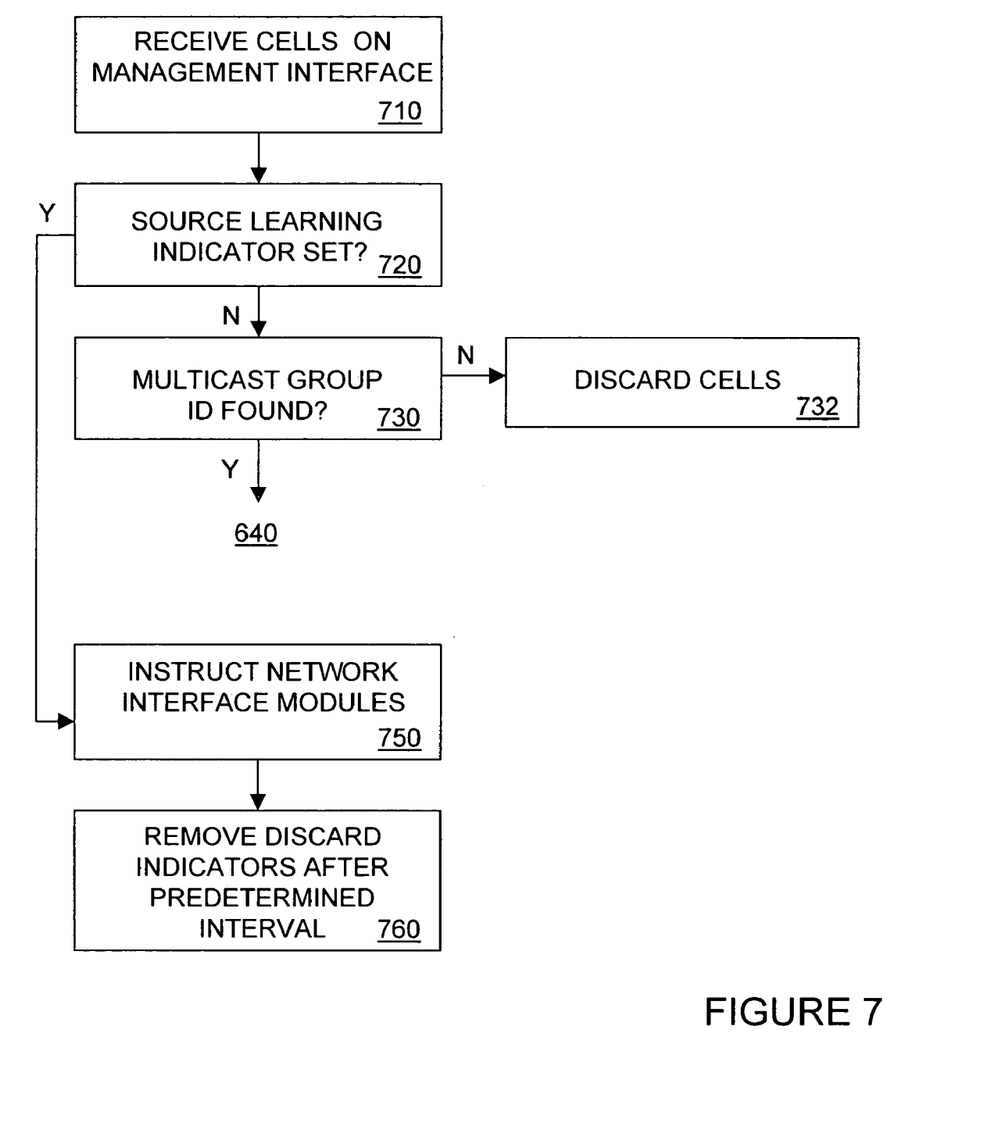
FIG. 7 is a flow diagram illustrating the management interface protocol in the switch according to FIG. 1.

When the network interface modules receive the transmitted cells (610) as illustrated in FIG. 6, the management interface module preferably also receives the transmitted cells (710) as illustrated in FIG. 7. Once the cells have been received by the management interface module, an operation preferably is performed to determine if the source learning indicator is set (720). In this case, the source learning indicator has been set and, as such, the management interface module preferably instructs the network, interface modules to perform a number of functions (750) including but not limited to the following.

Figure 8:
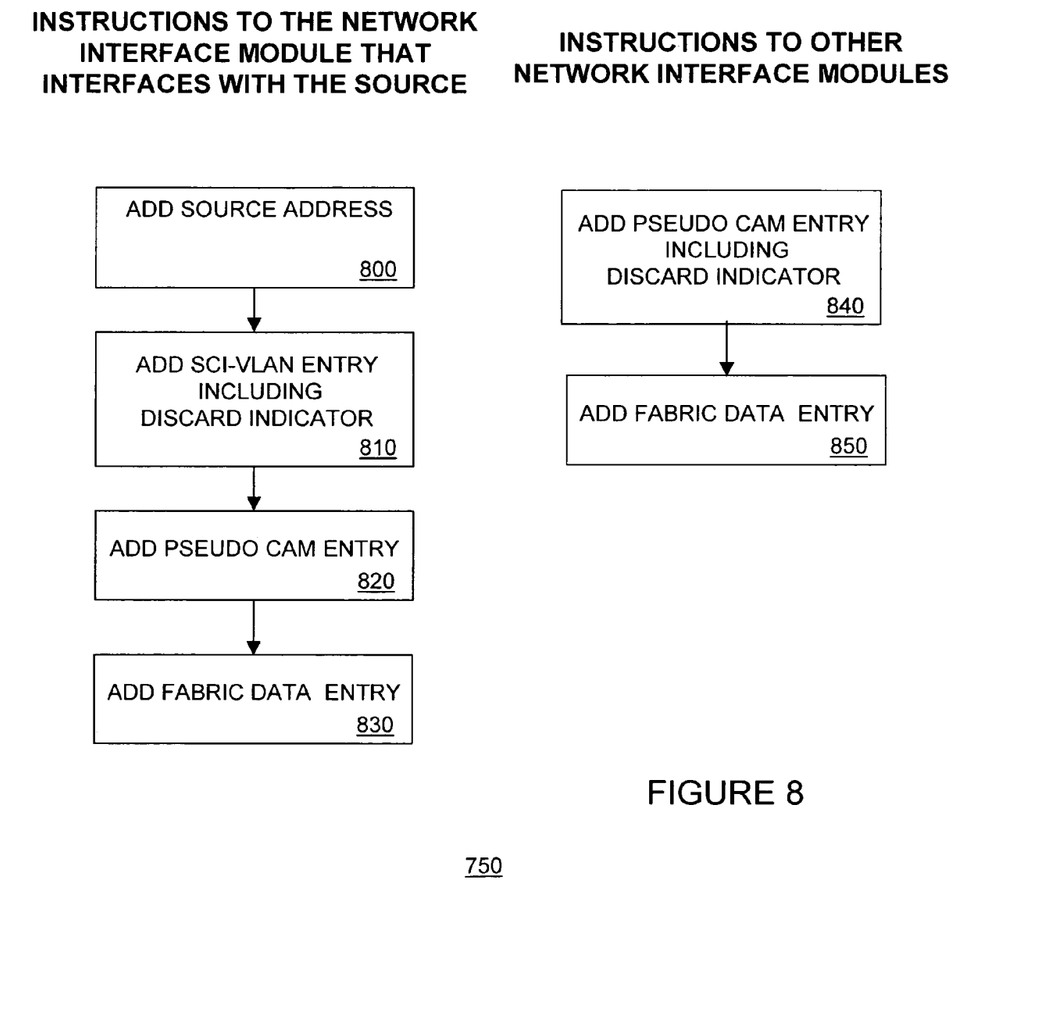
FIG. 8 is a flow diagram illustrating instructions provided to the network interface modules of FIG. 7 in further detail.

The instructions to perform these functions illustrated in FIG. 8 are described in reference to the network interface module 200 of FIG. 2 as the network interface module that interfaces with the network device whose address is undergoing source learning. However, the description of the functions are broadly applicable to any network interface module that interfaces with such network device, such as, for example, the network interface module 110, 120 or 130 of FIG. 1.

First, the switching controller 220 coupled to the network device whose address is undergoing source learning preferably is instructed by the switching control update signal 142 to add a source address of the network device to the CAM 221 (800). Second, the fabric controller 230 preferably is instructed by the fabric control update signal-141 to add a SCI-VLAN entry including a discard indicator to the VLAN Finder Module 231 (810). The discard indicator preferably causes the fabric controller 230 to discard packets from the network device whose address is undergoing source learning for a period, which, for example, may have been predetermined. In other embodiments, the period for discarding packets may be dynamically determined. Third and fourth, the management interface module preferably instructs the fabric controller 230 using the fabric control update signal 141 to add a pseudo CAM entry to the pseudo CAM 232 (820) and a fabric data entry (830) to the fabric data module 233, respectively.

Fifth, the management interface module preferably instructs the network interface modules that are not coupled to the network device whose address is undergoing source learning to add a pseudo CAM entry including a discard indicator to their respective pseudo CAMs using their respective fabric control update signals (840). The discard indicator preferably causes the respective fabric controllers of these network interface modules to discard packets destined to the network device whose address is undergoing source learning. Sixth, the management interface module preferably instructs the respective fabric controllers of the network interface modules that are not interfacing with the network device whose address is undergoing source learning to add a fabric data entry to their respective fabric data modules (850).

Once the discard conditions are indicated in the network interface modules for packets associated with a particular network device, the discard conditions preferably are removed after an interval passes to ensure that all the packets associated with that network device clear the multicast fabric. Here, the interval, for example, may have been predetermined. After the discard conditions are removed, the packets associated with that network device preferably are allowed to flow over the unicast fabric since both the destination and source addresses are now known to the switch.

Unknown Destination and Known Source:

Referring to FIG. 3, a packet is received on a physical port of a network interface module (310), which may be similar to the network interface module 200 of FIG. 2. Upon receiving this packet, a look-up operation preferably is performed to find source and destination addresses (320). Unless both the source and destination addresses are found (330), another query preferably is performed, as is the case here, to see if just the source address is found (340). If the source address is found (340), as is the case here, the packet preferably is outputted (400) with the source CAM index (SCI) applied (342).

Referring to FIG. 4, the packet (400) preferably is operated on to determine its virtual local area network (VLAN) identification (ID) from the SCI or SVPN (405). In this case, the VLAN ID preferably is determined from the SCI since the source address is known. Next, an SCI-VLAN entry is looked for in the VLAN finder module using the VLAN ID to determine whether a discard indicator is set in the SCI-VLAN entry (410). If the discard indicator is set (415), the packet preferably is discarded (475), and packets from the same network device as the packet preferably are discarded until the discard indicator is no longer set.

Under conditions here, the discard indicator is not set and, as a result, the packet preferably is not discarded. A pseudo CAM look-up key preferably is generated from the destination address and the VLAN ID (420). The pseudo CAM look-up key preferably is used to determine a destination CAM index (DCI) and a fabric data index (FDI) (425). Since the destination address is unknown in this case, a default destination CAM index (DCI) preferably is used.

The pseudo CAM look-up key preferably is also used to retrieve a pseudo CAM entry. If a discard indicator is set in the retrieved pseudo CAM entry (430), the packet preferably is discarded (475). As long as the discard indicator is set, all packets destined to the same network device as the packet preferably are discarded. The discard indicator is not set in the pseudo CAM entry in this case, and the packet preferably is not discarded. The FDI preferably is used to determine a destination interface ID and a multicast group ID (435).

Following this, the DCI preferably is applied to the packet (445). Since the destination address is unknown in this case, the DCI preferably has been set as default, which preferably instructs a flood of the network interface modules. After the DCI is applied to the packets, the packets preferably are segmented into cells (450). Prior to being transmitted (470), the cells preferably are given a source interface ID, the destination interface ID, and the multicast group ID (455).

Referring to FIG. 6, on receipt of the cells from the multicast fabric (610), the network interface module preferably performs a look-up operation of the multicast group ID (620) to determine whether or not to transmit the cells, i.e., the packet, out of its ports. If the multicast group ID is found (630), the cells preferably are reassembled (520) into the packet as illustrated in FIG. 5. If the DCI indicates flood (530), as is the case here, the packet preferably is transmitted out of all ports (532).

When the network interface modules receive the transmitted cells (610) as illustrated in FIG. 6, the management interface module preferably also receives the transmitted cells (710) as illustrated in FIG. 7. Once the cells have been received by the management interface module, an operation preferably is performed to determine if the source learning indicator is set (720). In this case, the source learning indicator has not been set and, as such, the management interface module preferably queries to see if the multicast group ID is found (730). In this case, the multicast group ID is found and the packet preferably is reassembled and processed (520) for receipt as illustrated in FIG. 5. Since the default DCI instructs the network interface module to flood (530) in this case, the packet is transmitted out of all ports (532) of the network interface module.

Known Destination and Unknown Source:

Referring to FIG. 3, a packet is received on a physical port of a network interface module (310), which may be similar to the network interface module 200 of FIG. 2. Upon receiving this packet, a look-up operation preferably is performed to find source and destination addresses (320). Unless both the source and destination addresses are found (330), another query preferably is performed, as is the case here, to see if just the source address is found (340). If the source address is not found (340), as is the case here, a source virtual port number (SVPN) preferably is applied to the packet, and a source CAM index (SCI) preferably is set as invalid (350).

Referring to FIG. 4, the packet preferably is operated on to determine its virtual local area network (VLAN) identification (ID) from the SCI or SVPN (405). In this case, the VLAN ID preferably is determined from the SVPN since the SCI has been set as invalid. Next, an SCI-VLAN entry is looked for in the VLAN finder module using the VLAN ID to determine whether a discard indicator is set in the SCI-VLAN entry (410). If the discard indicator is set (415), the packet preferably is discarded (475), and packets from the same network device as the packet preferably are discarded until the discard indicator is no longer set.

Under conditions here, the discard indicator is not set and, as a result, the packet preferably is not discarded. A pseudo CAM look-up key preferably is generated from the destination address and the VLAN ID (420). The pseudo CAM look-up key preferably is used to determine a destination CAM index (DCI) and a fabric data index (FDI) (425). Since the destination address is known in this case, a default destination CAM index (DCI) preferably is not used.

The pseudo CAM look-up key preferably is also used to retrieve a pseudo CAM entry. If a discard indicator is set in the retrieved pseudo CAM entry (430), the packet preferably is discarded (475). As long as the discard indicator is set, all packets destined to the same network device as the packet preferably are discarded. The discard indicator is not set in the pseudo CAM entry in this case, and, the FDI preferably is used to determine a destination interface ID and a multicast group ID (435).

Following this, the DCI preferably is applied to the packet (445) and the packets preferably are segmented into cells (450). The cells preferably are then given a source interface ID, the destination interface ID, and the multicast group ID (455). In this case, before the cells are transmitted (470) over the multicast fabric, the destination interface ID preferably is set to the multicast group ID and a source learning indicator preferably is set in the cells (465) since the SCI is invalid.

Referring to FIG. 6, on receipt of the cells from the multicast fabric (610), the network interface module preferably performs a look-up operation of the multicast group ID (620) to determine whether or not to transmit the cells, i.e., the packet, out of its ports. If the multicast group ID is found (630), the cells preferably are reassembled into the packet (520) as illustrated in FIG. 5. If the DCI indicates flood (530), the packet preferably is transmitted of all ports (532). In this case, since the destination address is known, the default DCI preferably is not used, and thus the packet preferably is not transmitted out of all ports.

Instead, a forwarding port ID preferably is determined from the DCI (540). Then the DCI and the SVPN preferably are used to determine whether or not the source and destination devices of the packet share a virtual LAN (VLAN) (550). If a VLAN is shared (560), the packet preferably is transmitted on the forwarding port identified by the forwarding port ID (570). If, however, the VLAN is not shared by the source and destination devices, the packet preferably is discarded (562).

When the network interface modules receive the transmitted cells (610) as illustrated in FIG. 6, the management interface module preferably also receives the transmitted cells (710) as illustrated in FIG. 7. Once the cells have been received by the management interface module, an operation preferably is performed to determine if the source learning indicator is set (720). In this case, the source learning indicator has been set and, as such, the management interface module preferably instructs the network interface modules to perform a number of functions (750) including but not limited to the following.

The instructions to perform these functions illustrated in FIG. 8 are described in reference to the network interface module 200 of FIG. 2 as the network interface module that interfaces with the network device whose address is undergoing source learning. However, the description of the functions are broadly applicable to any network interface module that interfaces with such network device such as, for example, the network interface module 110, 120 or 130 of FIG. 1.

First, the switching controller 220 coupled to the network device whose address is undergoing source learning preferably is instructed by the switching control update signal 142 to add a source address of the network device to the CAM 221 (800). Second, the fabric controller 230 preferably is instructed by the fabric control update signal 141 to add a SCI-VLAN entry including a discard indicator to the VLAN Finder Module 231 (810). The discard indicator preferably causes the fabric controller 230 to discard packets from the network device whose address is undergoing source learning for a period, which, for example, may have been predetermined. In Other embodiments, the period for discarding packets may be dynamically determined. Third and fourth, the management interface module preferably instructs the fabric controller 230 using the fabric control update signal 141 to add a pseudo CAM entry to the pseudo CAM 232 (820) and a fabric data entry (830) to the fabric data module 233, respectively.

Fifth, the management interface module preferably instructs the network interface modules that are not coupled to the network device whose address is undergoing source learning to add a pseudo CAM entry including a discard indicator to their respective pseudo CAMs using their respective fabric control update signals (840). The discard indicator preferably causes the respective fabric controllers of these network interface modules to discard packets destined to the network device whose address is undergoing source learning. Sixth, the management interface module preferably instructs the respective fabric controllers of the network interface modules that are not interfacing with the network device whose address undergoing source learning to add a fabric data entry to their respective fabric data modules (850).

Once the discard conditions are indicated in the network interface modules for packets associated with a particular network device, the discard conditions preferably are removed after an interval passes to ensure that all packets associated with that network device clear the multicast fabric. Here, the interval, for example, may have been predetermined. After the discard conditions are removed, the packets associated with that network device preferably are allowed to flow over the unicast fabric since both the destination and source addresses are now known to the switch.

Known Destination and Known Source:

Referring to FIG. 3, a packet is received on a physical port of a network interface module (310), which may be similar to the network interface module 200 of FIG. 2. Upon receiving this packet, a look-up operation preferably is performed to find source and destination addresses (320).

There are two different cases here, depending on whether the source and destination devices are local to the same network interface module or not. If the destination and the source devices are coupled to the same network interface module, the source and destination addresses are found (330) and the packet is discarded (332) from being sent to other network interface modules over the fabrics.

If the source and destination devices are not coupled to the same network interface module, the source address is typically locally known (340) but the destination address may not be locally known. A source CAM index (SCI) preferably is applied (342) to the packet.

Referring to FIG. 4, the packet preferably is operated on to determine its virtual local area network (VLAN) identification (ID) from the SCI or SVPN (405). In this case, the VLAN ID preferably is determined from the SCI since the source address is known. Next, an SCI-VLAN entry is looked for in the VLAN finder module using the VLAN ID to determine whether a discard indicator is set in the SCI-VLAN entry (410). The setting of the discard indicator in the SCI-VLAN entry preferably indicates that the packet is from the network device whose address is undergoing source learning.

Since both the source and destination addresses are known in this case, no source learning associated with the packet preferably takes place, and thus the discard indicator preferably is not set. Then a pseudo CAM look-up key preferably is generated from the destination address and the VLAN ID (420). Next, the DCI and FDI preferably are determined from the pseudo CAM look-up key (425). Since the destination address is known in this case, a default destination CAM index (DCI) preferably is not used.

The pseudo CAM look-up key preferably is also used to retrieve a pseudo CAM entry. If a discard indicator is set in the retrieved pseudo CAM entry (430), the packet preferably is discarded (475). The setting of the discard indicator in the pseudo CAM entry preferably indicates that the packet is destined to the network device whose address is undergoing source learning. In this case, both the source and destination address are known for the packet, and thus no source learning associated with the packet preferably takes place, and the discard indicator preferably is not set.

Next, the FDI preferably is used to determine a destination interface ID and a multicast group ID (435). Thereafter, the DCI preferably is applied to the packet (445) and then the packets are segmented into cells (450). Prior to being transmitted (470), the cells preferably are given a source interface ID, the destination interface ID, and the multicast group ID (455). Since both the source and the destination addresses are known, the multicast group ID in this case preferably contains a single destination. Therefore, the cells preferably are not forwarded to the multicast fabric but preferably are forwarded to the unicast fabric.

Referring to FIG. 5, on receipt of the cells from the unicast fabric (510), the cells preferably are reassembled into the packet (520). Next, a test preferably is performed to determine if the DCI has been set to flood (530). In this, the DCI preferably has not been set to flood since both the source and destination addresses are known and the unicast fabric has been used. Therefore, the packet is not transmitted out of all ports.

Instead, a forwarding port ID preferably is determined from the DCI (540). Then the DCI and the SCI preferably are used to determine whether or not the source and destination devices of the packet share a virtual LAN (VLAN) (550). If a VLAN is shared (560), the packet preferably is transmitted on the forwarding port identified by the forwarding port ID (570). If, however, the VLAN is not shared by the source and destination devices, the packet preferably is discarded (562).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

We claim:

1. A path transitioning data switch comprising:
a plurality of switching modules; and
a backplane interconnecting the switching modules on a plurality of paths, said backplane comprising a mulitcast fabric and a unicast fabric,
wherein flow integrity of data units for a flow undergoing path transition is maintained by temporarily disabling one or more of the switching modules from transmitting the data units for the flow to the backplane and further wherein the path transition is made from the multicast fabric to the unicast fabric upon source learning an address of a network device that provides the flow.

2. The path transitioning data switch of claim 1 wherein the switching modules are disabled from transmitting the data units for the flow when the path transition is commenced, and are enabled after the path transition has been completed and an interval has passed to ensure that all data units for the flow transmitted to the backplane prior to disabling the switching modules have cleared the backplane.

3. The path transitioning data switch of claim 1 wherein all switching modules are temporarily disabled from transmitting data units having the address undergoing source learning as a destination address to the backplane.

4. The path transitioning data switch of claim 3 wherein the switching module coupled to the network device whose address is undergoing source learning is temporarily disabled from transmitting data units having the address as a source address to the backplane.

5. The path transitioning data switch of claim 4 wherein the temporarily disabled switching modules are enabled to transmit to the backplane after source learning has been completed.

6. The path transitioning data switch of claim 5 wherein the temporarily disabled switching modules are enabled after an interval has passed to ensure that all data units having the source learned address as the source address or the destination address and transmitted to the multicast fabric have cleared the backplane.

7. The path transitioning data switch of claim 6 wherein said interval is predetermined.

8. A path transitioning data switch having a plurality of switching modules and a backplane interconnecting the switching modules on a plurality of paths, the data switch comprising:
means for transmitting a first data unit for a flow from a first switching module to a second switching module on a first path, the first path including a multicast fabric;
means for temporarily disabling the first switching module from transmitting data units for the flow;
means for transitioning the flow from the first switching module to the second switching module to a second path, the second path including a unicast fabric; and
means for transmitting a second data unit for the flow from the first switching module to the second switching module on the second path;
wherein the means for transmitting a first data unit transmits the data units for the flow on the first path before the flow is transitioned from the first path to the second path and wherein the means for transmitting a second data unit transmits the data units for the flow on the second path after the flow has been transitioned from the first path to the second path, and wherein the means for transitioning the flow transitions the flow from the multicast fabric to the unicast fabric after an address of a network device that provides the flow undergoes source leaning.

9. The path transitioning data switch of claim 8 wherein the first switching module includes the means for transmitting a first data unit and the means for transmitting a second data unit.

10. The path transitioning data switch of claim 8 wherein the first switching module is coupled to the network device that provides the flow, and the means for temporarily disabling the first switching module prevents the first switching module from transmitting the flow from the network device to the backplane while the address of the network device is undergoing source learning.

11. A path transitioning data switch of claim 8 wherein the first switching module is coupled to the network device that provides the flow, and the means for temporarily disabling the first switching module prevents the first switching module from transmitting the flow from the network device to the backplane for an interval to ensure that all data units of the flow have cleared the multicast fabric.

12. The path transitioning data switch of claim 11 wherein said interval is predetermined.

13. The path transitioning data switch of claim 10 wherein the means for temporarily disabling the first switching module includes means for discarding data units and means for instructing the means for discarding data units to discard the data units for the flow.

14. The path transitioning data switch of claim 13 wherein the means for temporarily disabling the first switching module further includes means for instructing the means for discarding data units to stop discarding the data units for the flow.

15. The path transitioning data switch of claim 11 wherein the means for transmitting a second data unit transmits the second data unit on the unicast fabric after the source learning has been completed.

16. A path transitioning data switch having a plurality of switching modules and a backplane interconnecting the switching modules, the data switch comprising:
means for transmitting a first data unit having a first address as a destination address over the backplane;
means for transmitting a second data unit having the first address as a source address over the backplane; and
means in response to the second data unit for temporarily disabling transmission over the backplane of data units having the first address as a destination address.

17. A path transitioning data switch of claim 16 wherein the first address is associated with a network device coupled to a first switching module, and the data switch performs source learning of the first address after receiving the second data unit from the network device.

18. A path transitioning data switch of claim 17 wherein the means for temporarily disabling transmission prevents transmission of the data units having the first address as the destination address while the first address undergoes source learning.

19. The path transitioning data switch of claim 18 wherein the means for temporarily disabling transmission includes means for discarding data units and means for instructing the means for discarding data units to discard the data units having the first address as the destination address.

20. The path transitioning data switch of claim 19 wherein the means for temporarily disabling transmission further includes means for instructing the means for discarding data units to stop discarding the data units having the first address as the destination address.

21. A path transitioning data switch of claim 17 wherein the means for temporarily disabling transmission prevents transmission of the data units from the network device to the backplane for an interval to ensure that all data units having the first address as the destination address have cleared the backplane.

22. The path transitioning data switch of claim 21 wherein said interval is predetermined.

23. A method of flow path transitioning in a data communication switch having a plurality of flow paths and a plurality of network interface modules, the method comprising the steps of:
receiving a first packet having an unknown source address from a source device coupled to a first network interface module;
transmitting the first packet over a first flow path to one or more network interface modules; and
performing source learning of the source address,
wherein the first network interface module is disabled from transmitting packets from the source device to other network interface modules while source learning of the source address is being performed, wherein other network devices are disabled from transmitting any packet having the source address undergoing source learning as a destination address over the flow paths until source learning has been completed.

24. The method of flow path transitioning of claim 23, the method further comprising the step of:
transmitting a second packet from the source device over a second flow path to a second network switching module after the source learning has been completed,
wherein the first flow path includes a multicast fabric and the second flow path includes a unicast fabric.

* * * * *